United States Patent [19]

Saito et al.

[11] 3,753,251

[45] Aug. 14, 1973

[54] BIPOLAR DRIVING METHOD AND DEVICE FOR A MAGNETIC THIN FILM MEMORY

[75] Inventors: Nobuo Saito, Mikaka; Kiyoo Ito, Kodaira; Yutaka Watanabe, Hatano; Kunihiko Yamaguchi, Hachioji, all of Japan

[73] Assignee: Hitachi, Ltd., Tokyo, Japan

[22] Filed: Feb. 23, 1971

[21] Appl. No.: 117,908

[30] Foreign Application Priority Data

Feb. 27, 1970 Japan ............................... 45/16837

[52] U.S. Cl. .................... 340/174 PW, 340/174 TF

[51] Int. Cl. ........................ G11c 11/14, G11c 11/04

[58] Field of Search ................ 340/174 TF, 174 PW

[56] References Cited

UNITED STATES PATENTS

| | | | |
|---|---|---|---|
| 3,222,645 | 12/1965 | Davis | 340/174 TF |
| 3,390,277 | 6/1968 | Spandorfer | 307/88 R |
| 3,462,750 | 8/1969 | Schwartz | 340/174 TF |
| 3,478,336 | 11/1969 | Kashiwagi et al. | 340/174 PW |
| 3,636,532 | 1/1972 | Van Stuyvenberg | 340/174 M |

OTHER PUBLICATIONS

IBM Technical Disclosure Bulletin, Vol. 2, No. 6, Apr. 1960, pg. 117–118

Journal of Applied Physics – Supplement to Vol. 33, No. 3, Mar. 1962, pgs. 1051–1056

*Primary Examiner*—James W. Moffitt
*Attorney*—Craig, Antonelli, Stewart & Hill

[57] ABSTRACT

A method for driving a digit line of a magnetic thin film memory by a bipolar digit current in order to write an information in the memory, characterized in that the bipolar digit current is purposely unbalanced in regard to the amplitude and/or the pulse width whereby the insusceptibility of the magnetic record to interference pulses is remarkably enhanced.

10 Claims, 13 Drawing Figures

INVENTORS

NOBUO SAITO, KIYOO ITO,
YUTAKA WATANABE & KUNIHIKO
YAMAGUCHI

BY Craig, Antonelli, Stewart & Hill
ATTORNEYS

INVENTORS
NOBUO SAITO, KIYOO ITO
YUTAKA WATANABE AND
KUNIHIKO YAMAGUCHI
BY
Craig, Antonelli, Stewart & Hill
ATTORNEYS

INVENTORS
NOBUO SAITO, KIYOO ITO,
YUTAKA WATANABE AND
KUNIHIKO YAMAGUCHI

BY Craig, Antonelli, Stewart & Hill
ATTORNEYS

INVENTORS
NOBUO SAITO, KIYOO ITO,
YUTAKA WATANABE AND
KUNIHIKO YAMAGUCHI
BY Craig, Antonelli, Stewart & Hill
ATTORNEYS

BIPOLAR DRIVING METHOD AND DEVICE FOR A MAGNETIC THIN FILM MEMORY

FIELD OF THE INVENTION

This invention relates to a write-in bipolar driving method and device for a magnetic thin film memory which is used in large quantities in the electronic computors, the electronic telephone exchangers or the like and which is favored because of the non-destructiveness in the read-out operation and the simplicity of the change of memory content in the write-in operation without requiring other means than electric means.

DESCRIPTION OF THE PRIOR ART

Figure 1:
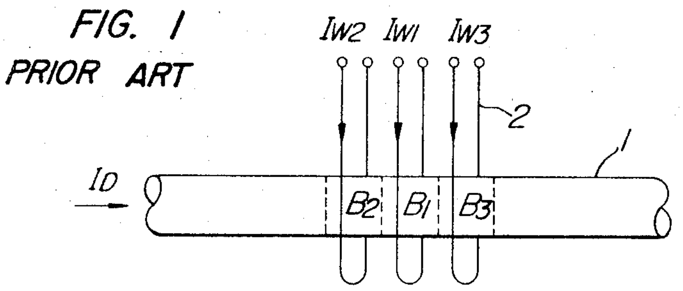
FIG. 1 PRIOR ART
FIG. 1 is a schematic diagram for explaining the principle of a known magnetic thin film memory.

A wire memory which is the typical magnetic thin film memory, is constituted, as schematically and partly shown in FIG. 1, of digit lines 1 each consisting of a rod-like conductor coated with a magnetic thin film and word drive lines 2 disposed to cross the digit lines 1. The write-in to such a memory is attained by driving an appropriate electric current through both of relevant digit line 1 and word drive line 2; while the read-out from the memory is performed by a current driven through the word drive line 2.

Figure 2A:
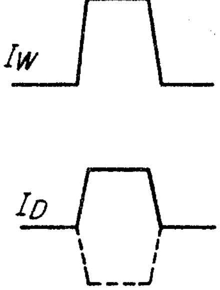
FIG. 2a PRIOR ART
FIGS. 2*a* and 2*b* show waveforms of the driving pulses used for the known magnetic thin film memory.
Figure 2B:
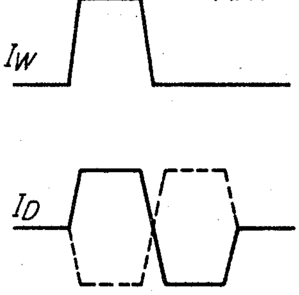
FIG. 2b PRIOR ART

Generally speaking, there are two writing modes for such a memory as described above corresponding to two types of waveforms of the digit current, as shown in FIGS. 2*a* and 2*b*. One is the unipolar writing mode in which a uni-directional digit current $I_D$ is driven in synchronization with a word current $I_W$ as shown in FIG. 2*a*. For example, the digit current is of positive polarity as shown with a solid line in the Figure if a "1" is to be written, while the current is negative as shown with a dash line if a "0" is to be written. The other writing mode is the bipolar mode in which a bi-directional digit current $I_D$ is driven with the starting uni-directional section thereof in synchronization with a word current $I_W$ as shown in FIG. 2*b*. For example, the positive portion of the digit current $I_D$ is synchronized with the word current $I_W$ as shown with a solid line in the Figure if a "1" is to be written, while the negative portion is synchronized with the word current as indicated with a dash line if a "0" is to be written.

Though the unipolar driving is advantageous in the points that less driving circuits are required and the cycle time is shorter, it is susceptible to so-called "creep" of the magnetization due to interference pulses. This necessitates strict requirements concerning characteristics of the memory elements. On the contrary, the bipolar system requires more driving circuits and longer cycle time; but it less suffers from creep, accordingly allowing use of less qualified memory elements.

However, with the conventional bipolar driving in which the digit current is balanced, that is, the amplitude and the pulse width of the bipolar pulse are identical in both polarities, the creep due to interference pulses cannot be suppressed over a certain degree. Therefore, further improvement in this respect has been requested.

SUMMARY OF THE INVENTION

To meet the above request, this invention is directed to an improvement in the bipolar driving method and device. According to the method of this invention, a bipolar digit current whose amplitude or pulse width is different in the positive and the negative portions of the current, is used to make a record which is little susceptible to the creep of magnetization.

DESCRIPTION OF PREFERRED EMBODIMENTS

The creep of magnetization in a memory is observed as the following phenomenon. That is, a magnetic record at a given bit written by the concurrent driving of the digit and word lines is affected by such an interference as repeated and alternate magnetization of adjacent bits, until a reversed output is read out from the affected bit. Degree of the interference depends largely on the amplitude of the interference pulses and the number of the repetition of the interference. Therefore, the insusceptibility of a memory element to the creep is expressed by the terms of the amplitude of interference pulse and the number of repetition of the interference which are required to cause the creep.

Figure 3:
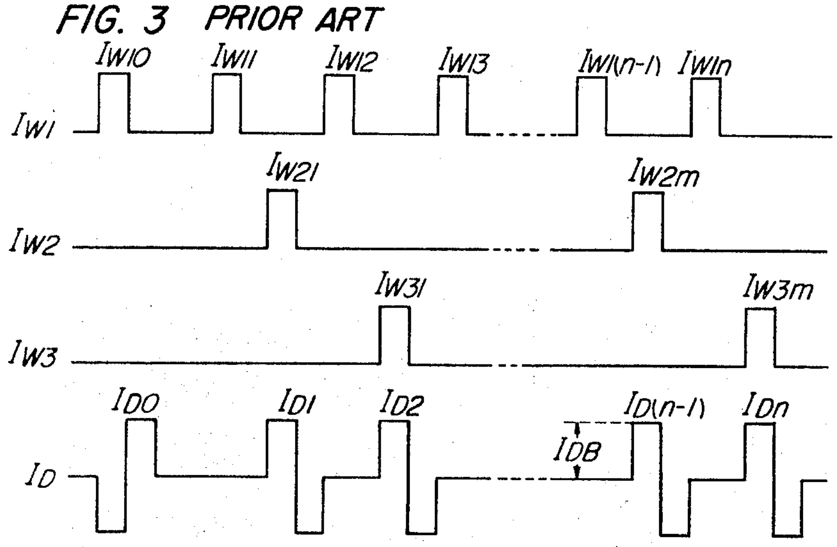
FIG. 3 PRIOR ART
FIG. 3 shows waveforms of the driving pulses in the worst pattern.

In order to determine the influence of repeated and alternate interference pulses to a record, the worst driving pattern as shown in FIG. 3 is designed. In FIG. 3, pulse sequence $I_{W1}$ represents a word current driven through the word drive line 2 for a given bit $B_1$ on the digit line 1 as shown in FIG. 1; pulse sequences $I_{W2}$ and $I_{W3}$ are word currents driven through the word drive lines 2 for the adjacent bits $B_2$ and $B_3$, respectively. Pulse sequences $I_D$ represent a digit current driven through the digit line 1.

According to this worst pattern, as is seen from FIG. 3, firstly a "0" is written at the bit $B_1$ of the digit line 1 with a word current $I_{W10}$ and a digit current $I_{D0}$, and then the recorded "0" is read out by a word current $I_{W11}$. Secondly, a "1" is written at the bit $B_2$ with a word current $I_{W21}$ and a digit current $I_{D1}$, and then the information "0" at the bit $B_1$ is again read out by a word current $I_{W12}$. Next, a "1" is written at the bit $B_3$ with a word current $I_{W31}$ and a digit current $I_{D2}$, again being followed by read-out of the record at the bit $B_1$. The same process of the alternate write-in of "1" at the bits $B_2$ and $B_3$ followed by the read-out of the initial record "0" at the bit $B_1$ is repeated.

The insusceptibility of a magnetic record to the interference pulses can be represented by the number of repetition of the above process required before the creep is at last detected, assuming that the amplitude and the pulse width of the digit current (pulse) are constant. Alternatively, if the above-mentioned number of repetition is taken as a parameter or a constant, the insusceptibility of the record will be represented by the magnitude of allowable digit current.

According to this invention, as mentioned hereinbefore, the insusceptibility of a record to interference pulses is enhanced by using a bipolar digit current whose amplitude or pulse width is different in the positive and the negative portions of the current. In order to prove this fact and further to determine the optimum value of the difference in the amplitude or pulse width, tests have been performed using the above-described worst pattern.

It will be understood that there are two modes in the method of this invention. In the first mode, the bipolar digit current is rendered unbalanced by setting the amplitude *a* in one polarity differently from the amplitude *b* in the opposite polarity as shown in section (I) of FIG. 4. On the other hand, in the second mode, the pulse widths *c* and *d* are made different as shown in section (II) of FIG. 4.

Figure 4:
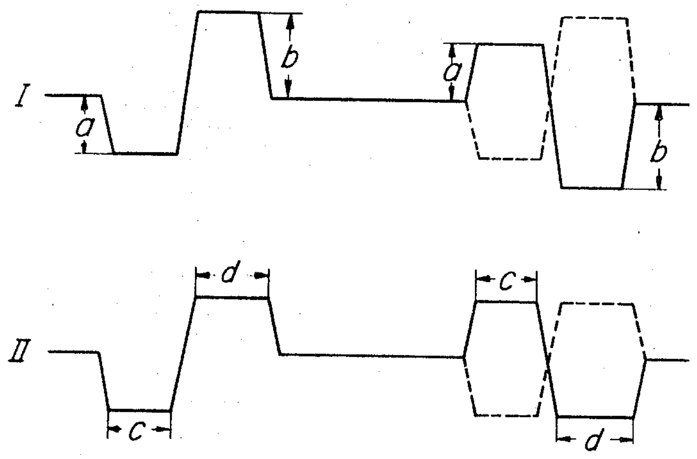
FIG. 4 shows waveforms of the driving pulses used according to this invention.
Figure 5:
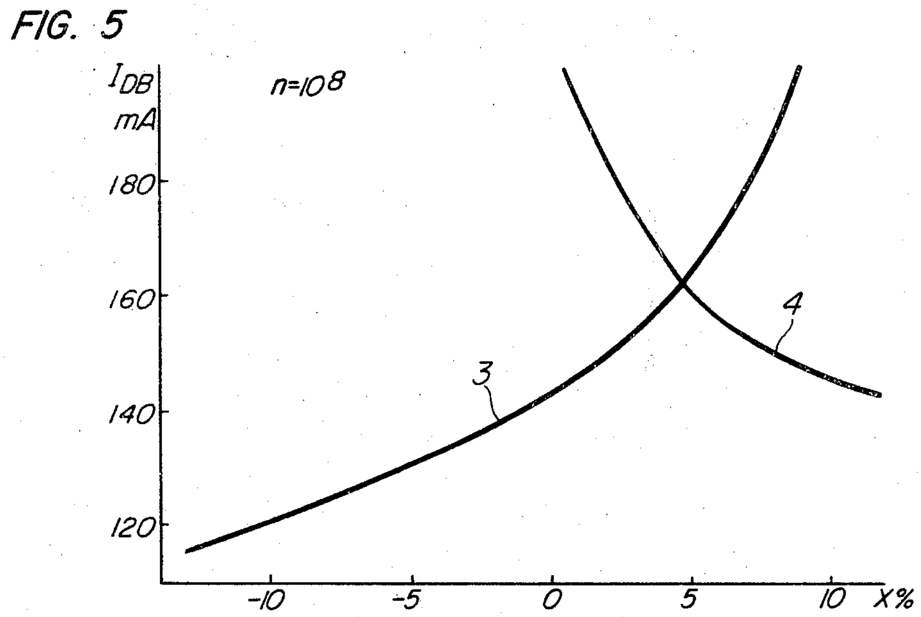
FIG. 5 is a graph showing the relation between a tolerable digit current and the relative difference of the amplitudes of the positive and the negative half waves of the bipolar driving current.

FIG. 5 shows a test result of the above-mentioned first mode, the abscissa representing the percent increment *x* of the amplitude *b* of the second portion of the digit current in relation to the amplitude *a* of the first portion, while the ordinate representing the tolerable digit current $I_{DB}$ in mA which would cause zero readout voltage (0 mV) after $10^8$ repetition of the interference according to the worst pattern. It should be noted that two types of the worst pattern must be used in the test of a bipolar driving method, one being the "1" interference to a "0" record as shown with a solid line in FIG. 4, and the other being the "0" interference to a "0" record as shown with a dash line in the same Figure. Curve 3 in FIG. 5 indicates the test result in the former case, while curve 4 is for the latter case.

Regarding the curve 3, it will be noted that the tolerable digit current $I_{DB}$ against $10^8$ interferences is approximately 143 mA if $x = 0$ percent, that is, the digit current is balanced. However, as the amplitude *b* of the second portion of the current increases in relation to the amplitude *a* of the first portion, thereby rendering the bipolar current unbalanced, the tolerable value $I_{DB}$ of the current increases until it becomes infinitely large at $x = 10$ percent. As to the curve 4, on the other hand, the tolerable digit current $I_{DB}$ is almost limitless if the current is balanced, but it decreases as the amplitude *b* is increased in comparison with the amplitude *a*.

The optimum value of *x* is determined so as to satisfy the condition that the tolerable current $I_{DB}$ is sufficiently large for the combined effect of both types of interference current. Namely, the optimum value is given as the cross point of the curves 3 and 4. From the graph, the optimum percent difference of amplitudes is found to be approximately 4.5 percent, the corresponding tolerable digit current being 162 mA. It should be noted that this value of the current is remarkably larger than the value for the balanced current which is 143 mA, clearly indicating the creep suppressing effect of the unbalanced digit current.

In the above example, the repetition number *n* of the interference has been set at $10^8$. However, it has been found that the same tendency is observed for the number of *n* in the range of $10^6$ to $10^{10}$.

Figure 6:
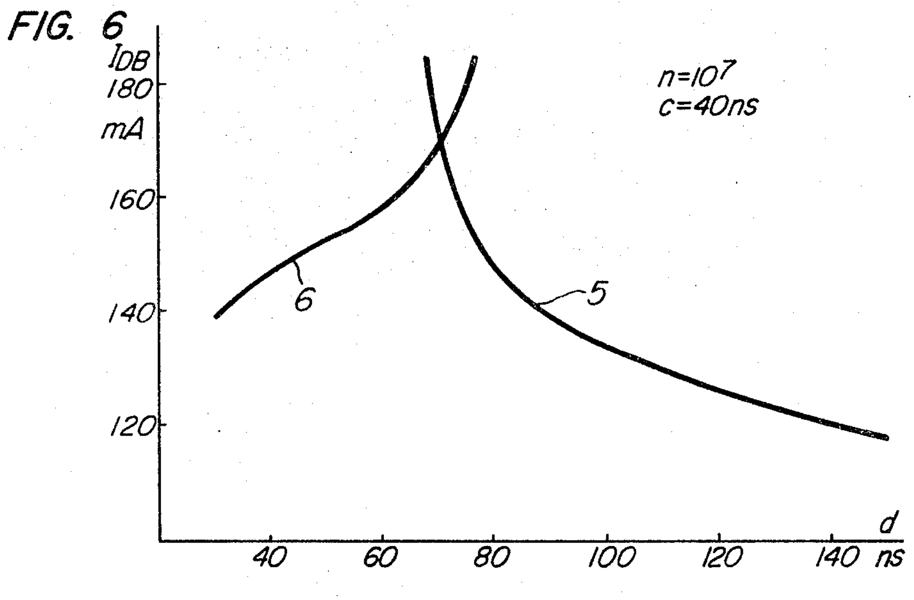
FIG. 6 is a graph showing the relation between a tolerable digit current and the difference in the pulse widths of the positive and the negative half waves of the bipolar driving current.

FIG. 6 shows a test result of the previously-mentioned second mode of the method of this invention. Namely, in this mode, the bipolar digit current is made unbalanced in the pulse widths. Assuming that the repetition number *n* of the interference is $10^7$ and that the width *c* of the leading pulse is constant and 40 ns, the abscissa of the graph represents the pulse width *d* of the ensuing portion of the bipolar digit current, and the ordinate represents the value of the tolerable digit current. Curve 6 indicates the test result with the pattern as shown with a solid line in FIG. 4, while curve 5 was determined with the test pattern as shown with a dash line in the same Figure.

Regarding the curve 5, the value of the tolerable digit current $I_{DB}$ is virtually the infinity for a pulse width *d* less than about 60 ns, but it decreases as the width *d* increases over 60 ns. On the other hand, the curve 6 indicates that the tolerable digit current $I_{DB}$ is 147 mA for the balanced current, that is, at $d = 40$ ns, and it increases as the pulse width *d* increases, approaching to the infinity as *d* exceeds 80 ns. Therefore, the optimum condition is presented as the cross point of the curves 5 and 6. Thus, it is determined that the optimum pulse width *d* of the second portion of the bipolar digit current is approximately 70 ns if the pulse width *c* of the first portion is 40 ns, and the allowable digit current is 170 mA. Again, it should be noted that this value of the current is remarkably larger than the value for the balanced current which is 147 mA in this case, clearly showing the creep suppressing effect of the unbalanced digit current.

In the above example, the repetition number *n* of the interference has been set at $10^7$. However, it has been found that there exists the same tendency for the number of *n* in the range of $10^6$ to $10^8$.

In the above description, the leading pulse (or the first portion) of a bipolar digit current is synchronized with a word drive pulse. However, it will be understood that a substantially similar effect is obtained also by synchronizing the ensuing pulse (or the second portion) of the bipolar digit current with the word drive pulse.

In the following paragraphs, circuits for generating the unbalanced bipolar current are described in connection with embodiments of such circuits.

Figure 7:
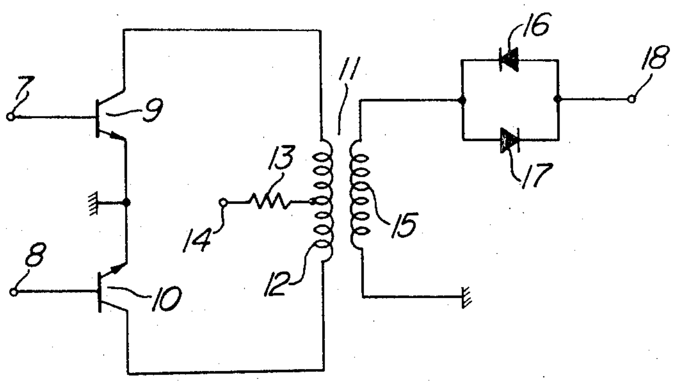
FIG. 7 is an electrical connection diagram of an embodiment of the driving circuit for generating one type of driving pulse according to this invention.

Referring to FIG. 7, pulse input terminals 7 and 8 are connected to the bases of transistors 9 and 10, respectively. The emitters of the transistors 9 and 10 are connected together to the ground, while the collectors of the same transistors are connected across the primary winding 12 of a transformer 11. The mid tap of the primary winding 12 is connected, through a resistor 13, to a power source terminal 14 of positive polarity. The secondary winding 15 of the transformer 11 has one end thereof grounded and the other end connected to an output terminal 18 through a parallel connection of diodes 16 and 17 disposed in mutually opposite directions. The output terminal 18 is coupled with a digit line as shown in FIG. 1.

Figure 8A:
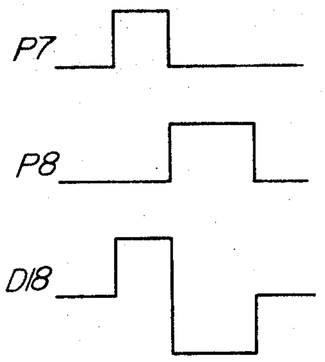
FIGS. 8*a* and 8*b* are diagrams of waveforms presented for the explanation of the operation of the circuit shown in FIG. 7.

Now, the operation of the circuit shown in FIG. 7 is described with reference to FIGS. 8*a* and 8*b*. It is assumed that two pulses P7 and P8 which are identical in the amplitude but different in the time of occurrence as well as in the pulse width as shown in FIG. 8*a*, are applied to the input terminals 7 and 8, respectively. While the leading pulse P7 is applied to the input terminal 7, the transistor 9 is conductive and a current flows through the power source terminal 14, the resistor 13, the upper half (as seen in FIG. 7) of the primary winding 12 and the transistor 9 to the ground. This current induces a current in the secondary circuit of the transformer 11, which appears at the output terminal 18 through the diode 17.

On the other hand, while the ensuing pulse P8 is applied to the input terminal 8, the transistor 10 is conductive and a current flows from the power source terminal 14 to the ground through the resistor 13, the lower half (as seen in FIG. 7) of the primary winding 12 and the transistor 10. This current induces a current in the secondary circuit of the transformer 11, which is taken out from the output terminal 18 through the diode 16. Therefore, a bipolar current D18 as shown in FIG. 8*a* flows through the output terminal 18 to drive the above-mentioned digit line of a memory.

Figure 8B:
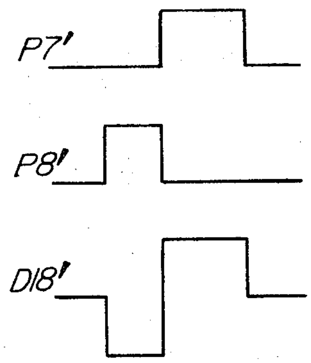

On the contrary, if a pulse P8' as shown in FIG. 8*b* which is similar to the pulse P7 shown in FIG. 8*a* is first applied to the input terminal 8 and then a pulse P7' corresponding to the pulse P8 is applied to the input terminal 7, a bipolar current D18' as shown in FIG. 8*b* is taken out through the output terminal 18 in substantially the same manner as described above.

It should be noted that though the diodes 16 and 17 exhibit low impedance for a large signal, they become non-conductive for a small signal, thereby preventing the read-out signal from entering the digit current generating circuit.

Figure 9:
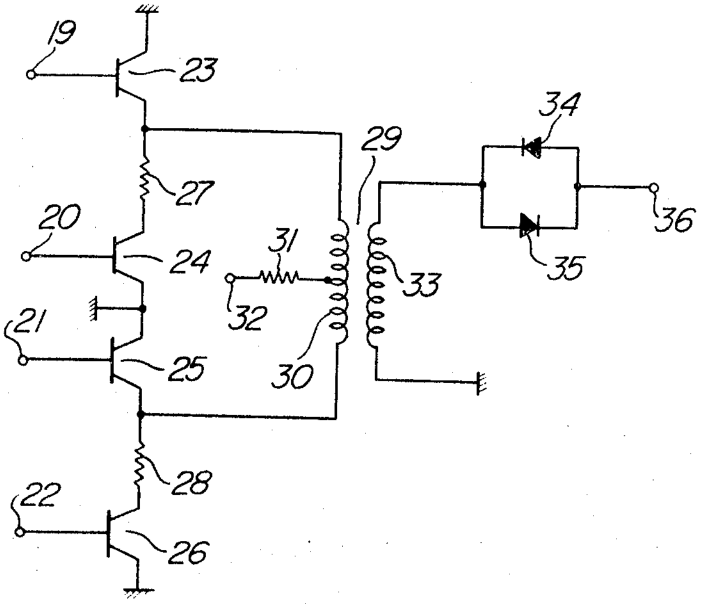
FIG. 9 is an electric connection diagram of another embodiment of the driving circuit for generating another type of driving pulse according to this invention.

Referring to FIG. 9 which shows an embodiment of the circuit for generating an unbalanced digit current as shown in the section I of FIG. 4, the pulse input terminals 19 to 22 are connected respectively with the bases of transistors 23 to 26 whose emitters are all grounded. The collectors of the transistors 23 and 24 are connected with each other across a resistor 27, while the collectors of the transistors 25 and 26 are similarly connected across a resistor 28. Further, the collectors of the transistors 23 and 25 are connected across the primary winding 30 of a transformer 29. The mid tap of the primary winding 30 of the transistor 29 is connected, through a resistor 31, to a power source terminal 32 to which a positive terminal of a power source is connected. The secondary winding 33 of the transformer 29 has one end thereof grounded. The other end of the secondary winding 33 is connected to an output terminal 18 through a parallel connection of diodes 34 and 35 disposed in mutually opposite direction. The output terminal 36 is connected with a digit line as shown in FIG. 1.

Figure 10A:
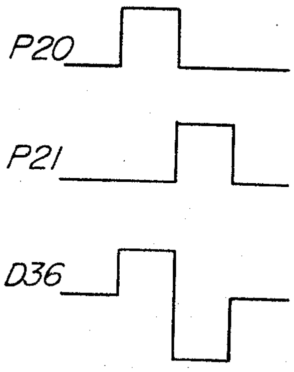
FIGS. 10*a* and 10*b* are diagrams of waveforms presented for the explanation of the operation of the circuit shown in FIG. 9.
Figure 10B:
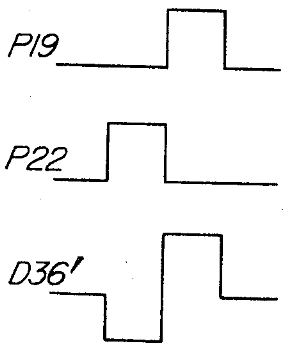

The operation of the circuit shown in FIG. 9 will be described hereinafter with reference to FIGS. 10*a* and 10*b*. If a pulse P20 as shown in FIG. 10*a* is first applied to the input terminal 20, being followed by the application of a pulse P21 to the input terminal 21, the pulse P21 being the same as the pulse P20 in the amplitude and the polarity, the transistor 24 is first turned to conductive by the pulse P20 and a current i1 flows from the power source terminal 32 to the ground through the resistor 31, the upper half (as seen in FIG. 9) of the primary winding 30, the resistor 27 and the transistor 24. Designating the source voltage at the terminal 32 as V, the resistances of the resistors 31 and 27 as $\gamma 1$ and $\gamma 2$, respectively, and assuming that the resistance of the primary winding is negligibly small, the current i1 is determined as $i1 = V/(\gamma 1 + \gamma 2)$. Next, the transistor 25 is turned to conductive by the pulse P21, and another current i2 flows from the power source terminal 32 to the ground through the resistor 31, the lower half (as seen in FIG. 9) of the primary winding 30 and the transistor 25. This current i2 is expressed by $i2 = V/\gamma 1$. By these currents *i1* and *i2*, a current is induced in the secondary circuit of the transformer 29, which flows through the secondary winding 33, the diode 34 or 35, the output terminal 36 and the digit line of a memory.

As described above, the currents *i1* and *i2* have mutually different values due to the existence of the resistor 27. Thus, a bipolar digit current D36 unbalanced in the amplitude as shown in FIG. 10*a* is obtained.

On the other hand, if a pulse P22 is first applied to the input terminal 22 and then an identical pulse P19 is applied to the input terminal 19, the transistor 26 is first turned to conductive by the pulse P22 and a current *i3* flows through the power source terminal 32, the resistor 31, the lower half of the primary winding 30, the resistor 28 and the transistor 26. Following it, the transistor 23 is turned to conductive by the pulse P19, and a current *i4* flows through the power source terminal 32, the resistor 31, the upper half of the primary winding 30 and the transistor 23. Assuming that the resistance of the resistor 28 is $\gamma 3$, the currents *i3* and *i4* are expressed as follows: that is, $i3 = V/(\gamma 1 + \gamma 3)$, and $i4 = V/\gamma 1$. Thus, the currents *i3* and *i4* have mutually different values. Accordingly, a bipolar current D36' unbalanced in the amplitude as shown in FIG. 10*b* is driven through the digit line.

It will be clear that the ratio of the amplitudes between the respective polarities can be changed by varying the resistance value of the resistor 27 or 28.

In this circuit too, the diodes 34 and 35 serve to prevent the read-out signal from entering the digit current generating circuit.

As is seen from the above description, the circuit shown in FIG. 7 generates a bipolar current which is unbalanced in the pulse width, while the circuit shown in FIG. 9 generates a bipolar current which is unbalanced in the amplitude. However, it will be understood that either of both circuits can be used to generate a bipolar current which is unbalanced both in the pulse width and in the amplitude. With the former circuit, this is achieved by applying, to the input terminals 7 and 8, pulses (as P7, P8 or P7', P8') which are different from each other in the pulse width as well as in the amplitude. With the latter circuit, it is only required to use, as the input pulses (P20, P21 or P19, P22), pulses which have mutually different pulse width.

We claim:

1. A bipolar driving device for a magnetic thin film memory comprising a plurality of digit lines each consisting of a rod-like conductor coated with a magnetic thin film and being driven by a bipolar digit current which consists of a leading pulse of one polarity and an ensuing pulse of the opposite polarity, said leading and ensuing pulses being unbalanced with respect to one another for reducing the creep susceptibility of the magnetic thin film memory; a plurality of word lines each being disposed to cross said digit lines and being driven by a word current in synchronization with said digit current; a digit driving means for generating said bipolar digit current; and word driving means for generating said word current.

2. A bipolar driving device for a magnetic thin film memory according to claim 1, wherein said digit driving means comprises first and second pulse input terminals for supplying a leading pulse and an ensuing pulse, respectively, said leading and ensuing pulses having different pulse widths, first and second transistors each having a base, an emitter and a collector, the bases of said first and second transistors being connected to said first and second pulse input terminals, respectively, the emitters of said first and second transistors being commonly connected to ground, a power source terminal for supplying power, and a transformer having a primary winding and a secondary winding, said primary winding having a mid tap connected to said power source terminal, said primary winding having one end connected to the collector of said first transistor and the other end connected to the collector of said second transistor, said secondary winding having one end thereof connected to ground and the other end thereof connected to each digit line.

3. A bipolar driving device for a magnetic thin film memory according to claim 1, wherein said digit driving means comprises first and second pulse input terminals for supplying a leading pulse and an ensuing pulse, respectively, first and second transistors each having a base, an emitter and a collector, the bases of said first and second transistors being connected to said first and second pulse input terminals, respectively, the emitters of said first and second transistors being connected to ground, a power source terminal for supplying power, a first resistor having one end thereof connected to the collector of one of said first and second transistors, a second resistor having one end thereof connected to said power source terminal, and a transformer having a primary winding and a secondary winding, said primary winding having a mid tap connected to the other end of said second resistor, said primary winding having one end thereof connected to the other end of said first resistor and the other end thereof connected to the collector of the other of said second and first transistors, said secondary winding having one end thereof connected to ground and the other end thereof connected to each digit line.

4. A bipolar driving method utilizing write-in driving for reducing the creep susceptibility of a magnetic thin film memory of the type having a continuous thin film capable of simultaneously storing a plurality of separate bits of information along the extent thereof comprising the steps of generating a bipolar digit current consisting of a leading pulse of one polarity and an ensuing pulse of opposite polarity wherein the leading pulse and the ensuing pulse are unbalanced with respect to one another, and energizing the magnetic thin film memory in accordance with the polarity of one of the leading and ensuing pulses.

5. A bipolar driving method according to claim 4, wherein the leading and ensuing pulses have different amplitudes.

6. A bipolar driving method according to claim 5, wherein the ensuing pulse has an amplitude which is approximately 4.5 percent greater than the amplitude of the leading pulse.

7. A bipolar driving method according to claim 4, wherein the leading and ensuing pulses have different pulse widths.

8. A bipolar driving method according to claim 7, wherein for a digit current of approximately 170 mA, the leading pulse width is approximately 40 ns and the ensuing pulse width is approximately 70 ns.

9. A bipolar driving method according to claim 4, further comprising the step of generating and applying a word current pulse to the thin film magnetic memory wherein the memory is energized in accordance with the polarity of one of the leading and ensuing pulses corresponding to an edge of the word current pulse.

10. A bipolar driving method according to claim 9, wherein the magnetic thin film memory is energized in accordance with the polarity of one of the leading and ensuing pulses corresponding to the trailing edge of the word current pulse.

* * * * *